United States Patent [19]

Murrell

[11] 4,414,632
[45] Nov. 8, 1983

[54] AUTOMATIC MONITORING SYSTEM FOR RADIO SIGNAL

[76] Inventor: Robert A. Murrell, 45375 Fox La. E., 106, Utica, Mich. 48087

[21] Appl. No.: 251,825

[22] Filed: Apr. 7, 1981

[51] Int. Cl.³ .......................................... G06F 15/20
[52] U.S. Cl. .................................. 364/487; 364/486; 455/115; 324/77 B; 343/414
[58] Field of Search ............... 364/487, 486, 55, 551; 455/115, 67; 324/77 R, 77 C, 77 CS, 77 B, 78 R; 343/107, 108 R, 109

[56] References Cited

U.S. PATENT DOCUMENTS

| | | | |
|---|---|---|---|
| 3,750,176 | 7/1973 | Sawicki et al. | 343/109 X |
| 3,793,597 | 2/1974 | Toman | 324/77 B X |
| 3,890,620 | 6/1975 | Toman et al. | 343/108 R |
| 4,074,201 | 2/1978 | Lennon | 455/67 X |
| 4,118,666 | 10/1978 | Bernstein | 324/77 C |
| 4,183,087 | 1/1980 | Huelsman | 364/487 X |
| 4,267,600 | 5/1981 | Campbell | 455/115 |

Primary Examiner—Edward J. Wise
Attorney, Agent, or Firm—Donald J. Singer; Bernard E. Franz

[57] ABSTRACT

The radiated signal of an instrument landing system (ILS) has several monitor probes for the radiation. For each probe the RF signal is demodulated to obtain a composite signal, from which information is extracted by sampling at specific points of one cycle. Sample voltages are combined by addition, subtraction, and division to obtain relative RF level, total percentage modulation, and difference of the depth of modulation (DMM). A digital monitor is the preferred embodiment, utilizing a microprocessor for converting the sampled voltage into binary data. The monitor accepts inputs from eight probes and is self synchronized. Data is compared with established limits to indicate an alarm condition. In another embodiment, an analog monitor has a processor board for each input to be monitored, and a common control board.

8 Claims, 10 Drawing Figures

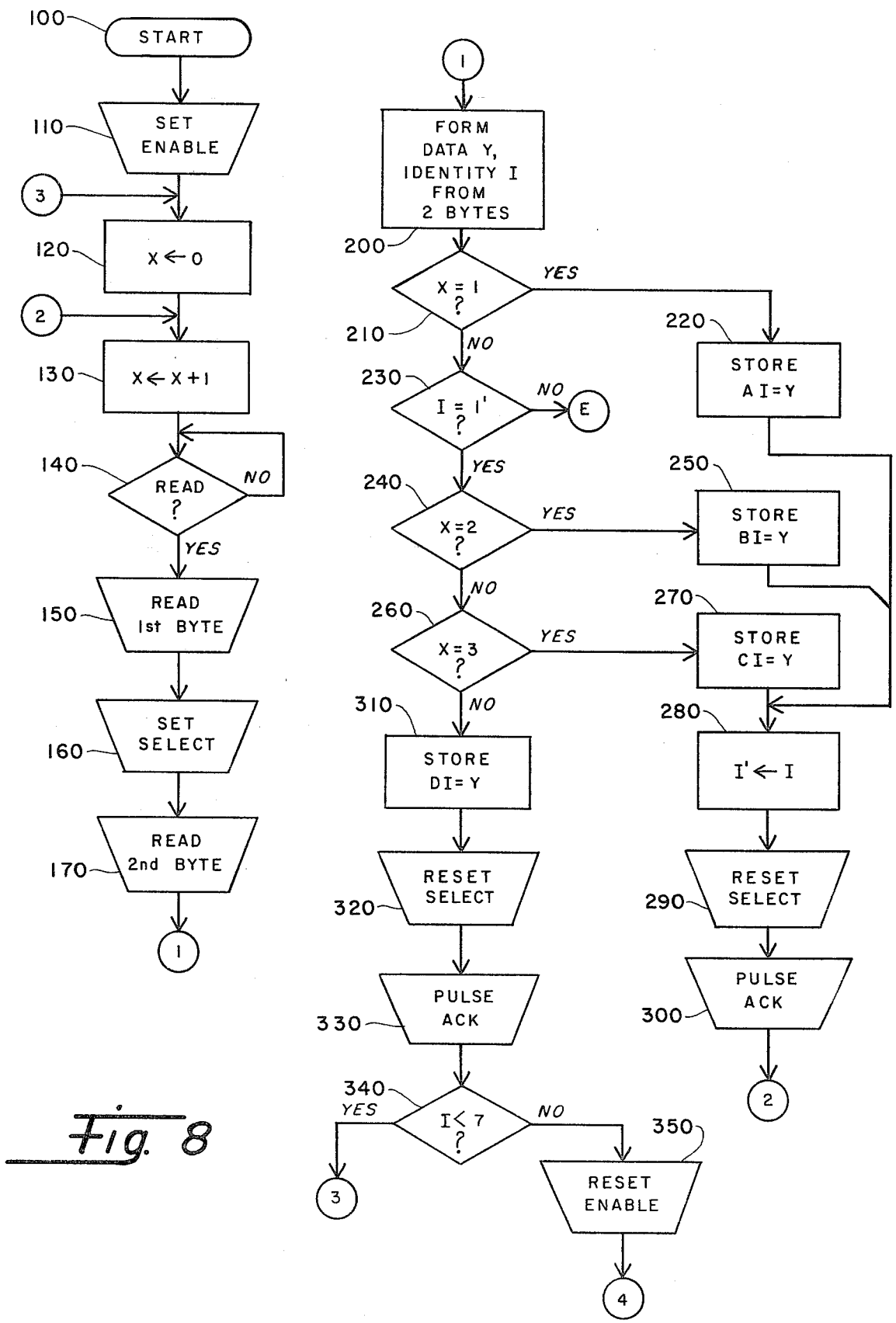

AUTOMATIC MONITORING SYSTEM FOR RADIO SIGNAL

RIGHTS OF THE GOVERNMENT

The invention described herein may be manufactured and used by or for the Government of the United States for all governmental purposes without the payment of any royalty.

BACKGROUND OF THE INVENTION

This invention relates to a system which continuously monitors and analyzes the quality of transmitted radio signals, and more particularly to a system to monitor and analyze the parameters of the signals of an instrument landing system.

The Federal Aviation Administration (FAA) requires that certain parameters of Instrument Landing Systems (ILS) transmitters must be monitored for changes to insure the quality of the radiated signal.

Instrument Landing Systems are ground based transmission systems that provide runway approach information to aircraft. The system consists of two (2) major components, the localizer station, which provides runway centerline information, and the glideslope station, which provides glidepath information.

The ILS signal is modulated with two (2) audio tones, a 90 Hz tone and a 150 Hz tone, that are equal level. Complex antenna radiation patterns and separately radiated sideband components modify the modulation of the tones so that they are of different levels at different points of the pattern. This difference in the levels, when processed by the aircraft receiver, creates an approach corridor. This corridor is oriented along extended runway centerline, has a specific angle, and horizontal and vertical width. For localizers, if an aircraft is on centerline, the 90 Hz and 150 Hz will have equal levels and the receiver crosspointer will be centered. As it flies to the left of centerline, the level of the 90 Hz will increase and the 150 Hz will decrease. This excess of 90 Hz will generate a fly right indication in the receiver. The opposite happens on the right of centerline. The glideslope operates in a similar manner, with an excess of 90 Hz above glidepath, and an excess of 150 Hz below.

Both the localizer and glideslope stations have complex monitoring systems that continuously check the parameters of the ILS signal. The monitors look for changes in RF level, total percent modulation, and the difference of the modulation of the two (2) tones at selected points of the radiated pattern. If there is a change of any parameter that exceeds tolerances established by the Federal Aviation Administration, the monitors automatically initiate actions to remove the defective equipment from service.

The approach information transmitted by the ILS is in the difference of the modulation of the two (2) tones. This difference is called the difference of the depth of modulation, or DDM, and is the modulation factor of one (1) tone subtracted from the modulation of the other tone. Modulation factor is the ratio of the audio peak voltage to the RF level, and is described by the formula Va/Vc, where Va is the peak amplitude of the audio, and Vc is the amplitude of the unmodulated carrier. Percent modulation is the modulation factor multiplied by 100.

The localizer transmitted signal has the audio modulated at 20 percent per tone. This means that the 90 Hz is at a modulation factor of 0.2000 and the 150 Hz is at a modulation factor of 0.200. This condition of equal modulation is called modulation balance. The DDM in this condition is 0.200 minus 0.200, or 0.000 DDM. In the radiation pattern, this is the condition on runway centerline. The total percent modulation is the sum of the modulation factors times 100, or $(0.200+0.200) \times 100 = 40\%$.

At the width points, as established by FAA, the modulation factor of one (1) tone is 0.1225, and the other is 0.2775. The DDM is $0.2775 - 0.1225 = 0.155$ DDM, and the total modulation is $(0.2775 + 0.1225) \times 100$, or 40%. Note that as the DDM changes the percent modulation doesn't change.

The composite 90 Hz and 150 Hz is a complex waveform, that is described by the formula: $\sin 3X + \sin 5X$. This waveform, as shown in FIG. 1, repeats itself 30 times a second, and has a phase relationship such that the peak of the 90 Hz does not coincide with the peak of the 150 Hz. Because of the phase relationship, if the formula Va/Vc is applied to this composite signal at 20% per tone, the percent modulation would appear to be 37% instead of 40%.

The monitors check the transmitted signal through a linear detector. The detector changes the RF to a DC voltage. The detected signal is the composite 90 Hz and the 150 Hz on a DC level, as shown in FIG. 1.

The present monitoring methods are analog in nature. They check the parameters by separating the individual components of the signal, then electronically performing the modulation formula to get the required information.

The detected signal usually goes through several stages of amplification. From the amplifiers, it is sent through a filter that separates the audio from the DC level (the RF level, or Vc). The audio is sent through another filter that separates the 90 Hz from the 150 Hz. The two (2) tones are detected and filtered to produce DC voltages that represent the peaks of the audio (Va). Having both components of the basic formula, they are applied to electronic math circuits to get percent modulation and DDM. RF level is an arbitrary value that is monitored for change.

SUMMARY OF THE INVENTION

The object of the invention is to provide a monitoring system which is simpler, faster, and more efficient than previous methods. It does not use the complex analog filter and detector circuits of the previous systems.

The monitoring system according to the invention uses sampling pulses to sample four (4) specific points of a detected composite signal. These samples are added or subtracted, then divided electronically to obtain the information to be monitored. This technique can be implemented with a number of analog and digital circuits, but is better suited for digital equipment.

A feature is that the monitor checks the signal in much the same way as the maintenance technician does—it extracts the information directly from the detected ILS signal.

Due to the digital nature of my technique, it requires only one cycle of the composite ILS signal to extract the information. Analog circuits tend to be more complex and consume more power than digital circuits. Monitors using my technique have the capability of converting the signal to digital data very early in the monitoring process.

BRIEF DESCRIPTION OF THE DRAWING

FIGS. 8 and 8A comprise a flow chart of the program for the digital computer of FIG. 4.

DETAILED DESCRIPTION

Figure 1:
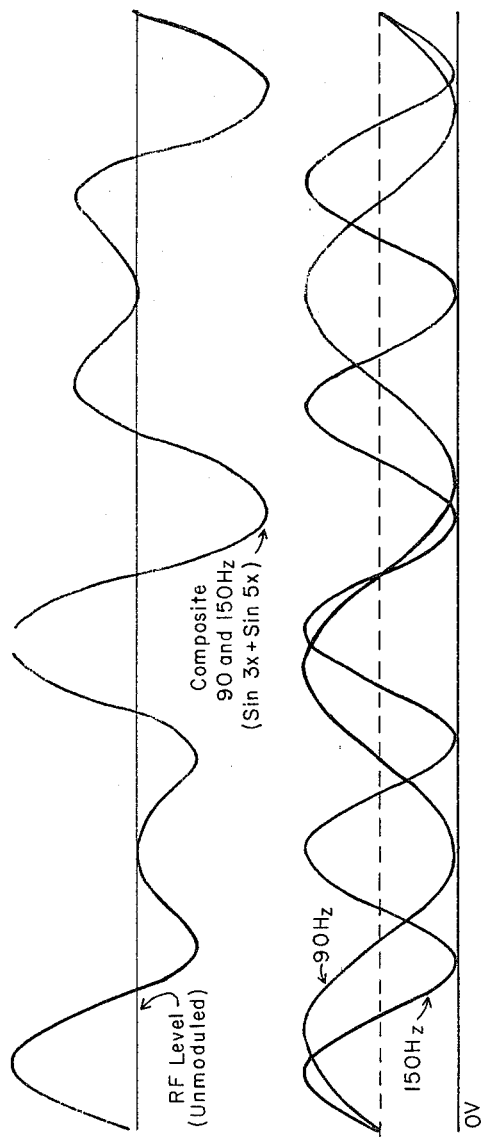
FIG. 1 comprises two graphs showing the detected ILS localizer signal with separate 90 Hz and 150 Hz in the proper phase relationships superimposed.

The general principles of the Instrument Landing System (ILS) have been described under "BACKGROUND" with reference to FIG. 1.

Digital Sampling Technique

My technique extracts the information directly from the detected signal using only four (4) sampling pulses. It eliminates all the complex filtering circuits used in present methods. These samples are added to and substracted from each other to get three (3) voltages, one representing RF level (Vc), and two representing peak audio voltages (Va). The two (2) Va's, divided by Vc, will give DDM (difference of the depth of modulation) and percent modulation.

As stated earlier, the composite signal repeats itself at a 30 Hz rate. Starting at the positive crossover point, and dividing the signal into 360 degrees, the four (4) samples are at 22.5, 90, 270, and 337.5 degrees. See FIG. 2. For discussion purposes, the samples will be labeled A, B, C, and D respectively, DDM will be Va1, and percent modulation will be Va2.

Creation of RF Level (Vc)

Figure 2:
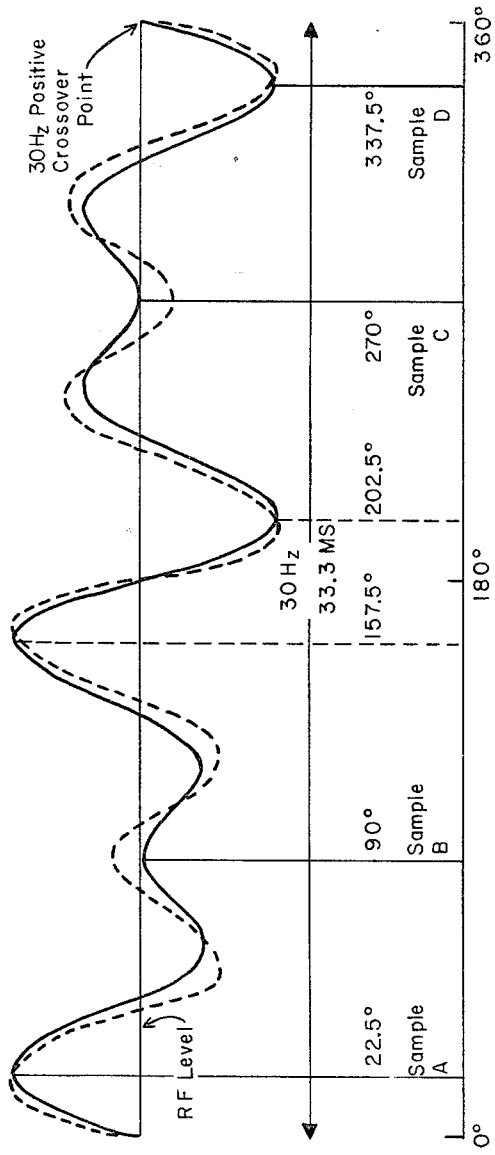
FIG. 2 is a graph of the ILS signal showing the 30 Hz crossover point and location of sampling pulses, with a dotted line graph which shows a 0.125 DDM 150 Hz condition.

As shown in FIG. 2, at samples B and C, the signal level is equal to the RF level. This is only true when in modulation balance. As the DDM increases, one point will decrease as the other point increases. However, this change is symmetrical about the RF level. If one point decreases by any amount, the other will increase by the same amount. This is shown by the dotted line in FIG. 2. The sum of these two (2) points will remain constant under any DDM condition, and will equal 2Vc. Therefore; $B+C=2Vc$.

Creation of DDM (Va1)

DDM is a modulation factor that is zero (0) at modulation balance and can increase to a maximum of 0.400 for a localizer. The difference between samples B and C is zero (0) at modulation balance and increases in direct proportion with DDM. This difference can be compared to the peak to peak voltage of an AC sine wave. Since the peak of the audio is equal to Va, then the peak to peak voltage would equal 2Va. Sample B minus C equals 2Va1. Inserting 2Va1 and 2Vc into the modulation formula, the 2's cancel, leaving Va1/Vc. This will equal DDM. If B−C is positive, there is an excess of 150 Hz, if negative, there is an excess of 90 Hz. The formula for DDM is: $(B-C)/(B+C)=DDM$.

Creation of Percent Modulation

Figure 3:
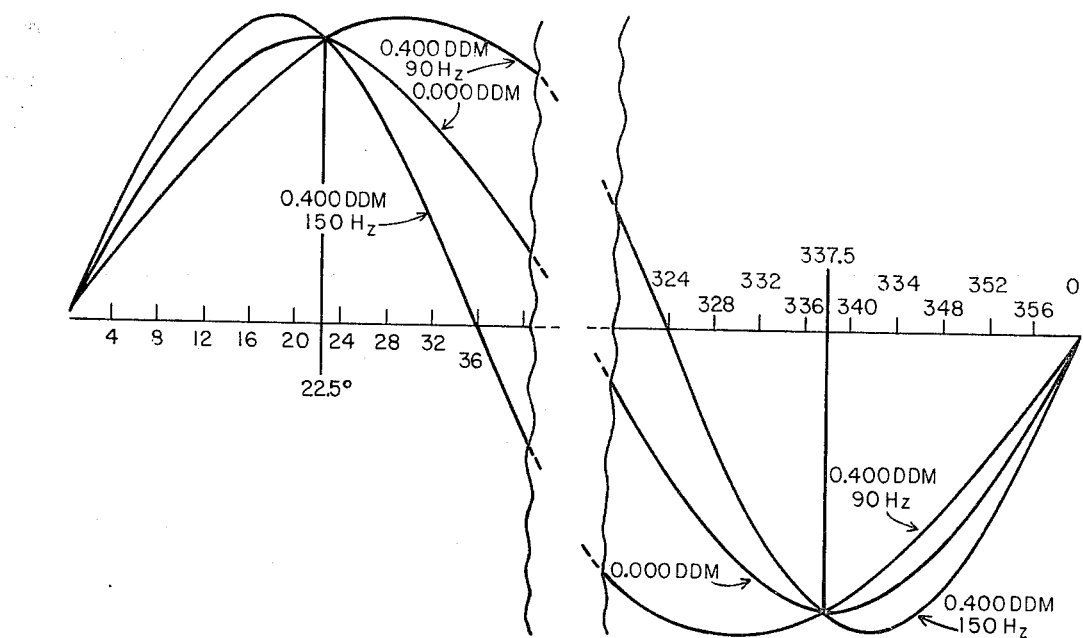
FIG. 3 is a graph of the area around the 22.5 degrees and 337.5 degrees under modulation balance at the extremes of DDM.
Figure 6:
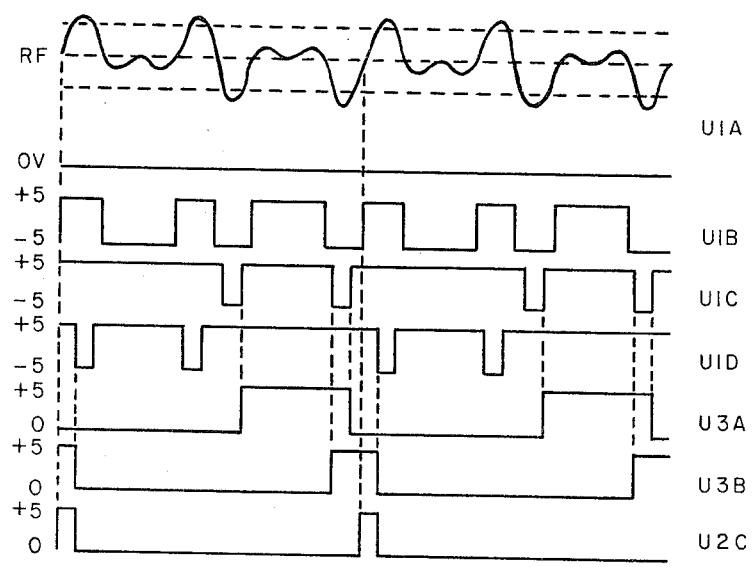
FIG. 6 is a timing diagram of the sync operation for FIG. 5.

FIG. 3 is a graph of $\sin 3X + \sin 5X$, in the area of 22.5 degrees and 337.5 degrees at 0.400 DDM 90 Hz, modulation balance, and 0.400 DDM 150 Hz. These points, samples A and D, are crossover points of the 90 Hz and 150 Hz. The 90 Hz and 150 Hz do not peak at the same time, but they do cross each other at several points. As shown in FIG. 3, these points do not change level at any DDM value. Since samples A and D are at maximum crossover points, they will show the greatest change in percent modulation.

Either point contains the information for percent modulation, but the use of two (2) samples will make the math circuits simpler. Sample A is equal to Va+Vc. With only this pulse, the formula for obtaining 2Va2 would be; $2A-(B+C)$. Sample A would have to be doubled before it could be applied to this formula. However, the difference of samples A and D equals 2Va2. This will fit directly into the modulation formula. The formula for percent modulation is; $(A-D)/(B+C)=$ Percent Modulation.

ILS Signal Considerations

The accuracy of this technique is sensitive to the phase relationship of the tones. There will be an apparent change in DDM and percent modulation as the tones misphase. Audio misphasing will affect the percent modulation more than the DDM. The selection of 22.5 and 337.5 degrees as the samples A and D will tend to minimize the affects of misphasing. If a misphasing condition should occur that would cause sample A to increase away from the RF level, sample D would increase toward the RF level. However, the point that moves toward the RF level will move faster than the point that moves away from the RF level. The indicated percent modulation would appear to decrease. Small misphasing will not affect the accuracy of this technique very much. Additionally, most of the newer ILS equipment has digital tone generators. Their phase relationships are hardware products and do not change.

The localizer is modulated with 3 or 4 character Morse code identity signal. This identity is a 1020 Hz tone modulated at 5 to 10 percent. This signal will affect the RF level, DDM, and percent modulation, so it must be filtered out before the sampling circuits. The filter must be designed to eliminate the 1020 Hz without disturbing the phase relationships of the 90 Hz and 150 Hz.

Practical Circuits

Figure 5:
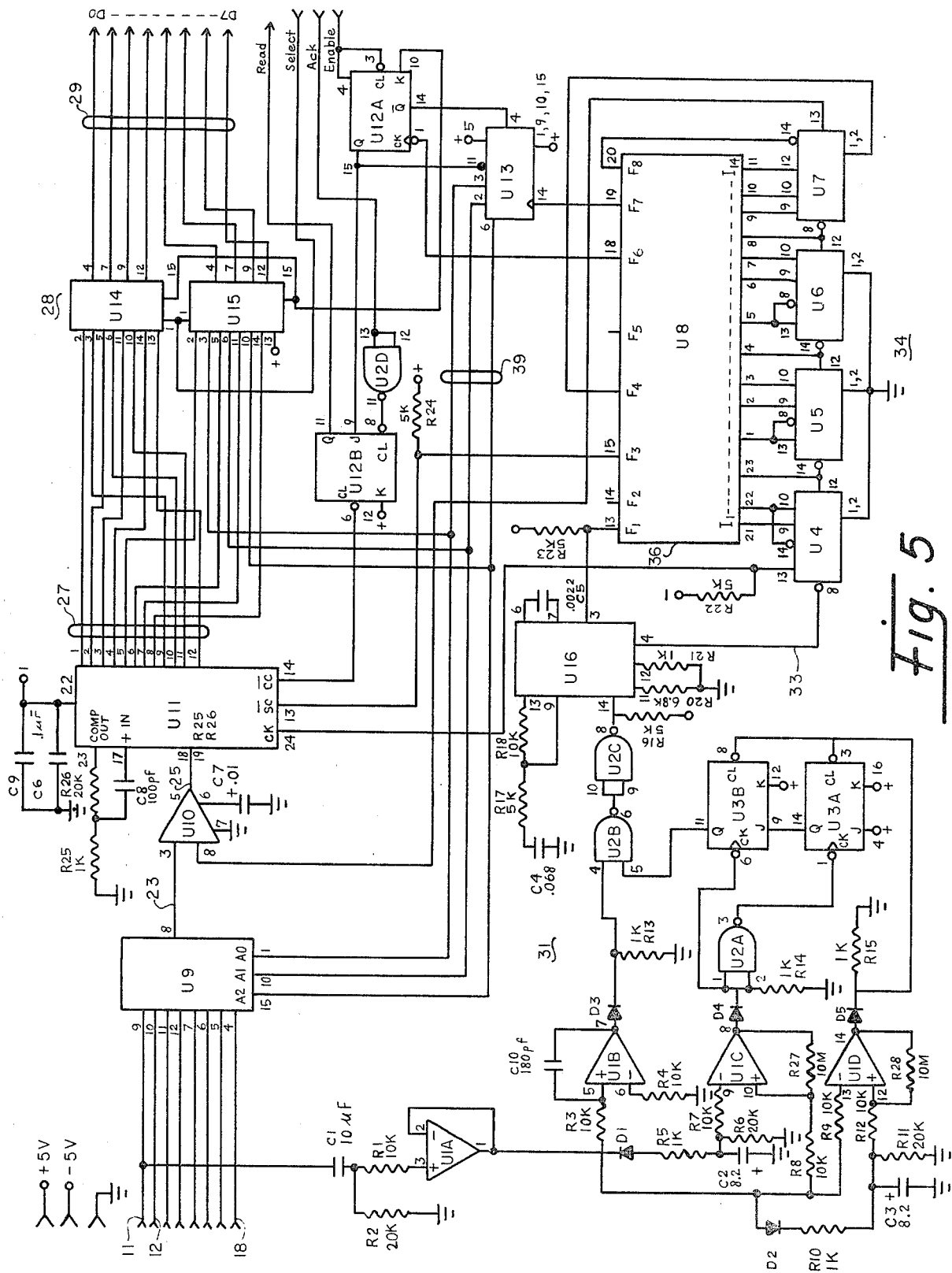
FIG. 5 is a schematic diagram of the digital monitor of FIG. 4.
Figure 7:
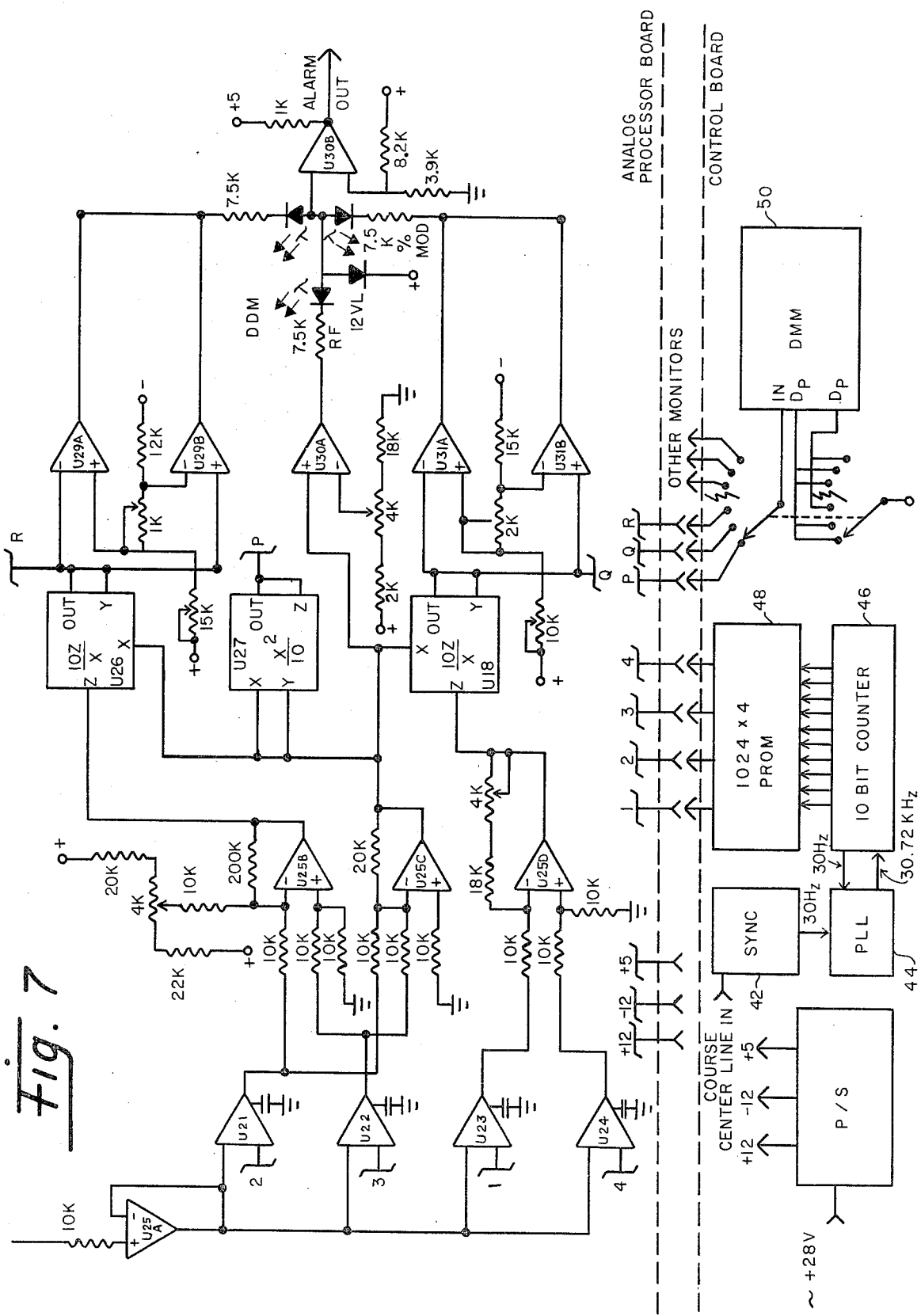
FIG. 7 is a schematic diagram of an analog processor.

There are many ways to implement this technique. FIGS. 5 and 7 are examples of workable circuits for digital and analog oriented equipment.

Summary

This monitoring technique is a process for extracting information from an ILS signal by sampling it at specific points. These sample voltages are added, subtracted, and divided in different combinations, to obtain the relative RF level, total percent modulation, and DDM of the input signal. Starting at the 30 Hz position crossover point, the samples at 90 and 270 degrees are combined to obtain a voltage that will relate to DDM and RF level. Samples at 22.5, 157.5, 202.5, and 337.5 are combined, in several different ways, to obtain a voltage that will relate to percent modulation. The 30 Hz positive crossover point is the point where both the 90 Hz and the 150 Hz cross zero (0) in a positive direction.

This technique is very fast. It only requires one (1) cycle of the composite ILS signal to extract the required information. This makes it ideal for a microprocessor based system.

The digital monitor of FIG. 5 requires only one other board to be operational. This board would amplify and filter the inputs, and process the identity signal for monitoring. The digital monitor needs no alignments. Its only requirement is that the input signal must always be between about 1 and 5 volts peak. All the alarm limits are part of the computer's software. The digital monitor is similar and cheaper than the analog monitor. However, the digital monitor may not respond to an alarm condition as fast as any analog monitor.

The analog monitor continuously checks the input and can respond almost instantly to an out-of-tolerance signal. The digital monitor only samples the signal when the computer requests it. When the computer is performing other tasks, the monitor is inhibited and unable to sample the input signals. But the analog monitor is more complex than the digital because it requires a processor board for each input.

Due to the high speeds of computers the delay between monitor checks would not be very long. A computer could sample the input signals every 1 or 2 seconds, and could perform numerous housekeeping tasks between these checks.

DIGITAL MONITOR

Figure 4:
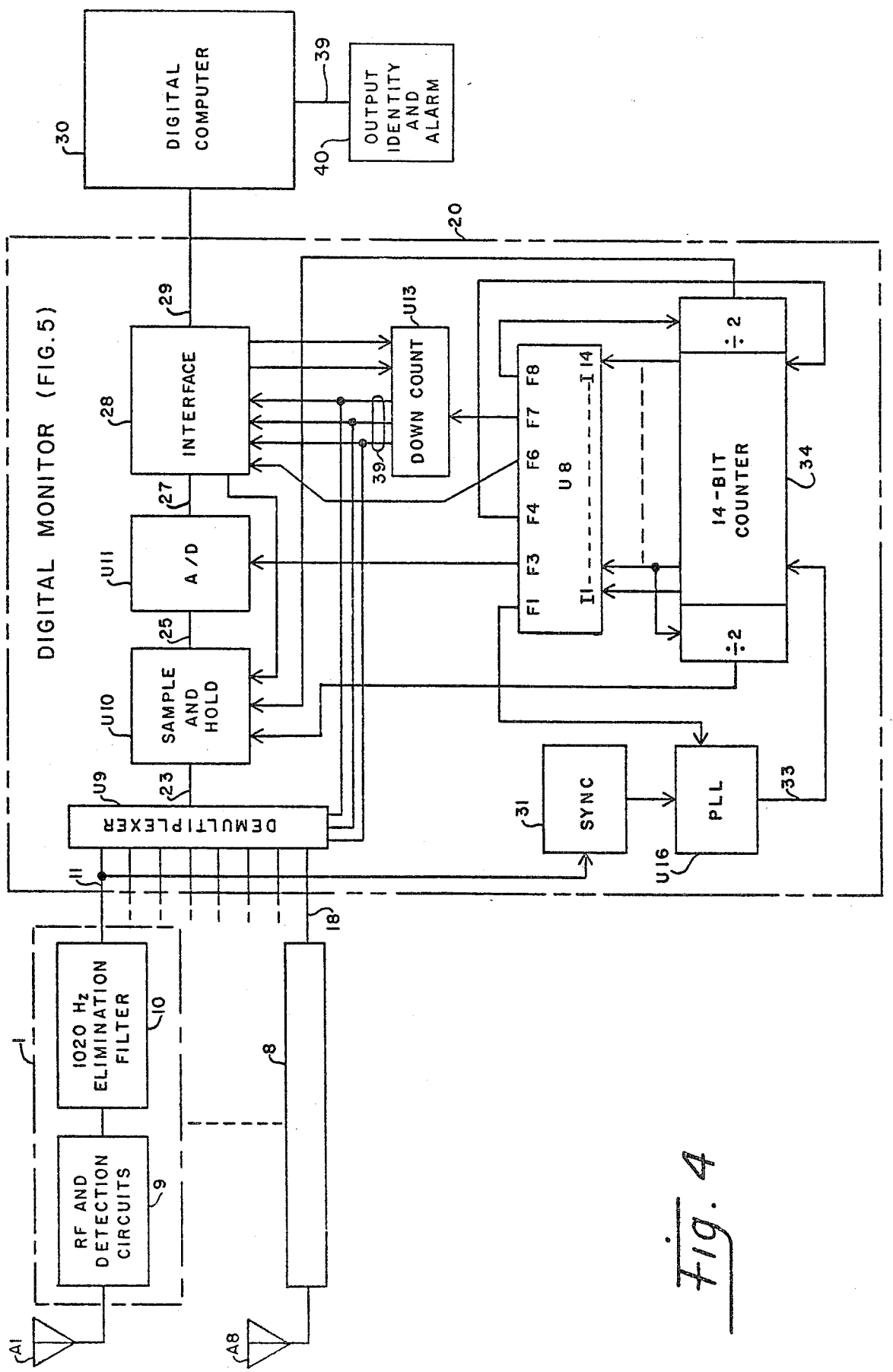
FIG. 4 is a block diagram of a digital monitoring system.

A block diagram of a system comprising a digital monitor is shown in FIG. 4. The input board contains up to eight receiver circuits 1 to 8, each of which has some RF and detection circuits 9, and a filter 10 to eliminate the 1020 Hz tone. The signals on the respective lines 11 to 18 are the composite signals of 90 Hz and 150 Hz, each of which has a normal value of DDM depending on the location in the pattern being monitored by the corresponding receiver. The devices A1 to A8 shown by conventional antenna symbols may be proximity probes located in the ILS transmitting antenna.

In the digital monitor 20, the inputs on lines 11 to 18 are selected one at a time by a demultiplexer U9. The selected signal on line 23 is supplied to a sample and hold circuit U10, and thence via line 25 to an analog-to-digital converter U11. The digital signals on line 27 are supplied via an interface circuit 28 and an eight-conductor line 29 to a digital computer 30. The computer performs the calculations of adding, subtracting, and dividing the digitized information in different combinations to obtain the relative RF level, total percent modulation, and DDM of the input signal.

The digital monitor 20 includes several circuits for timing the operation and identifying the input line. A synchronization generator 31 and a phase-locked loop U16 supply pulses during each composite cycle via lead 33 to a computer 34. The counter is organized to provide a 14-bit binary counter, and two divide-by-two sections. The fourteen bits are decoded by a programmed logic array U8 (along with gates U17 and U18 in FIG. 5A), to provide timing signals to the sample and hold circuit 24, to the A/D converter U11 and to the interface 28. A down counter U13 is decremented once each composite cycle, to provide for selection of the eight inputs 11 to 18 in sequence. Its output on three leads 39 controls the demultiplexer 22, and sends the input identity via interface 28 to the computer 30.

Figure 5A:
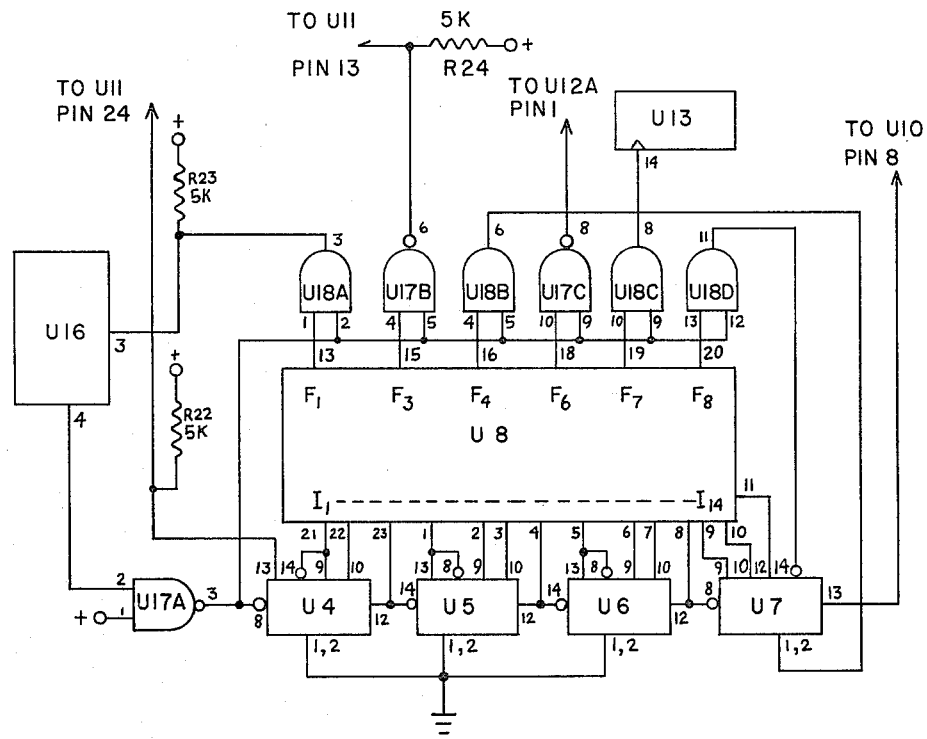
FIG. 5A is a schematic diagram showing gates added to FIG. 5.

FIGS. 5 and 5A show the detail circuits of the digital monitor 20. This monitor is a microprocessor peripheral that converts the sample voltages into binary data. It can accept eight inputs and is self synchronized. The computer 30 performs the math to get RF level, percent modulation, and DDM, and compares these results with established limits to check for an alarm condition. An output unit 40, coupled to the computer 30 by a multiconductor line 39, may provide a display or other output for each input identity I to indicate RF level, percent modulation, or DDM out of limit, and also activate an alarm. This will signal the transmitter control unit to initiate the appropriate action.

The monitor 20 comprises integrated circuits designated U1 to U16 shown in FIG. 5 and also circuits U17 and U18 shown in FIG. 5A. Pin numbers are shown on leads adjacent to the devices. The circuits of FIG. 5 show the basic logic, while the two added gate circuits U17 and U18 shown in FIG. 5A insure clean "glitch free" outputs from array U8.

Devices U1, U2, and U3 make up the sync generator 31. It produces a pulse in coincidence with the signal 30 Hz positive crossover point. U16 is the phase locked loop (PLL), whose output frequency is synchronized by the sync generator output. The PLL output is fed to counters U4, U5, U6, and U7, forming the 14 bit binary counter 34. The outputs of the counter key the programmed logic array U8. The outputs of array U8 control the operation of the monitor. Gates U17 and U18 delay the outputs of array U8 to prevent false triggering. Device U9 is an 8 to 1 analog demultiplexer. The output of device U9 is selected by device U13, the four bit down counter. Device U10 is the sample and hold circuit that is keyed by one output of counter U7. The output of circuit U10 is fed to device U11, a 12 bit analog to digital converter. It converts the sampled voltage to a binary number. Devices U2D, U12, U14, and U15 form the interface 28 from the converter output 27 to an 8 bit data buss 29. The data output is in a double precision format. The first 8-bit data byte consists of the first 8 lower bits of data. The second byte consists of the upper four data bits, a three bit identity code, and the sign bit.

Detailed Operation of Circuits

Sync Circuit

Device U1A is a unity gain amplifier that provides isolation of the course centerline signal. It also removes the DC from the composite signal, making it symmetrical about zero volts. Amplifiers U1B, U1C, and U1D are comparators. Comparator U1B is a zero (0) crossover detector, whose output switches in the same direction as the input, when it crosses zero (0) volts. The output of comparator U1C switches in a negative direction on the negative peaks of the signal. The negative peaks of the audio are passed by diode D1 and charge capacitor C2. This DC level is applied to the inverting input of comparator U1C. When the negative peak of the signal at the non-inverting input surpasses the voltage at the inverting input, the output of comparator U1C will switch negative. Comparator U1D switches in a negative direction on the positive peaks of the signal, in a similar manner as comparator U1C. Diodes D3, D4, and D5 make the outputs of the comparators TTL compatible.

As seen in the timing diagrams, the output of comparator U1D will clear flip-flop U3 A and B. The low from the Q output of flip-flop U3A is applied to the J input of flip-flop U3B. Flip-flop U3B is clocked on the leading edge of comparator U1C output. However, the J input is low, so flip-flop U3B will not change states. Flip-flop U3A is in the toggle mode (J and K inputs are high). It will toggle on the trailing edge of comparator U1C output, and its Q output will go high. The high on the J input of flip-flop U3B puts it in the toggle mode. The leading edge of the next pulse from comparator U1C will toggle flip-flop U3B. The Q output of flip-flop U3B is applied to AND gate U2B. The other input to gate U2B is the output of the zero crossing detector, U1B, and is low at the time flip-flop U3B toggles. When the output of comparator U1B goes high, the output of gate U2B will go low, and will be inverted by gate U2C. This transition is coincident with the 30 Hz crossover point of the input signal. The next output will reset flip-flop U3A and B, and the process will repeat. Device U16, the PLL, will sync on the leading edge of this pulse. Resistor R16 is used to interface the TTL logic levels to CMOS levels. If the transmitter has digital 90 Hz and 150 Hz tone generators, a 30 Hz sync pulse can be applied to device U16 directly from the generator. Then there would be no need of the sync circuit.

Control Circuit

The output frequency of the PLL U16 will be 16,384 times the sync input. This will be 491,52 KHz with a 30 Hz sync, and is applied to counters U4, U5, U6, and U7, which form the counter block 34. Gate U17A inverts the clock signal so that the counter block will toggle on the upclock of the output of PLL U16. These IC's are divide by eight and divide by two binary counters. The divide by eight portion has the input at pin 8 and the outputs at pins 9, 10 and 12, and the divide by two portion has the input at pin 14 and the output at pin 13. The output at pin 13 of counter U4 is 71.44 KHz and is used to clock the analog to digital converter U11. The divide by two portion of counter U7, pin 13, is used to drive the sample and hold IC U10. The input, pin 14, is clocked by the F8 output of unit U8. The rest of counters U4 thru U7 is a 14 bit binary counter whose outputs key the programmed logic array, U8.

The outputs of array U8 control all the functions of the monitor. The F1 output produces a pulse at a count of zero. It is used by the PLL to regulate the output frequency by comparing it to the sync input. The F3 output starts the analog to digital conversion. The F4 output will clear counter U7 at a count of zero. The F6 output clocks flip-flop U12A when the monitor is enabled by the computer. The F7 output decrements downcounter U13, which will select the input to demultiplexer U9. The F8 output toggles on, then off the divide by 2 portion of counter U7, which will cause circuit 24 (U10) to sample the input signal. Gates U17B and U18D (FIG. 5A) delay the outputs of array U8 to suppress false outputs. During the time the counter block is toggling, the changing inputs to array U8 may generate some very short outputs or "glitches." However, since the inverted clock from gate U17A is low at this time, the gates will inhibit these outputs. One half clock cycle later, when the outputs of array U8 are stable, the gate U17A output will go high and enable the gates. Resistors R22, R23, and R24 interface TTL logic levels to CMOS levels. The correct sequence of the outputs is shown in table A, which is the programming key for array U8. The input is shown in degrees of the composite cycle, and also in the hexadecimal form of the 14-bit binary number of inputs I1 to I14.

TABLE A

| De-grees | Input Address Hex | F1 | F3 | F4 | F6 | F7 | F8 | Remarks |
|---|---|---|---|---|---|---|---|---|
| 0 | 0000 | H | L | H | L | L | L | F1 Sync, F4 U7 Reset |
| 22.0 | 03E9 | L | L | L | L | L | H | F8 Start Sample A |
| 22.5 | 03FF | L | L | L | L | L | H | F8 Stop Sample A |
| 25.0 | 0472 | L | H | L | L | L | L | F3 Start A-D conversion |
| 89.5 | 0FE9 | L | L | L | L | L | H | F8 Start Sample B |
| 90.0 | 0FFF | L | L | L | L | L | H | F8 Stop Sample B |
| 92.5 | 1072 | L | H | L | L | L | L | F3 Start A-D Conversion |
| 269.5 | 2FE9 | L | L | L | L | L | H | F8 Start Sample C |
| 270.0 | 2FFF | L | L | L | L | L | H | F8 Stop Sample C |
| 272.5 | 3072 | L | H | L | L | L | L | F3 Start A-D conversion |
| 337.0 | 3BE9 | L | L | L | L | L | H | F8 Start Sample D |
| 337.5 | 3BFF | L | L | L | L | L | H | F8 Stop Sample D |
| 340.0 | 3C72 | L | H | L | L | L | L | F3 Start A-D conversion |
| 350.0 | 3E39 | L | L | L | L | H | L | F7 Change input |
| 355.0 | 3F1C | L | L | L | H | L | L | F6 Key enable |

Analog to Digital Circuit

The IC U9 is an 8-to-1 analog demultiplexer. The binary count at its inputs A0, A1, and A2 from line 39 (the output of down counter U13), will select which of the input signals 11 to 18 goes to the input of sample and hold circuit U10, which samples the input when the logic input goes high. When the logic input goes low, the signal voltage at that time is stored in capacitor C7. This voltage is buffered in circuit U10 and fed to device U11, a 12 bit analog to digital converter. When the $\overline{SC}$ input goes low, it starts the conversion process. The $\overline{CC}$ output will go low when the conversion is completed. The digital output, pins 1 thru 12, will be in its complement, or inverted form.

Interface Circuit

Flip-flop U12A is used to key on the monitor when it is enabled by the computer 30. It prevents the monitor from transmitting data when it is in the middle of a sampling cycle. When the enable input goes high, flip-flop U12A will go into the toggle mode and toggle on the next clock pulse. It receives its clock from the F6 output of array U8. The $\overline{Q}$ output tied to the K input will prevent it from toggling after the first clock. It is also used to enable down counter U13, and to connect devices U14 and U15 to the data buss. The Q output is used to preset down counter U13 and allow flip-flop U12B to toggle. Device U13 is a 4 bit downcounter. When pin 4 is high it is disabled, and will not count. A low on pin 11 presets the outputs with the data on pins 1, 9, 10, and 15. Since these pins are high, the outputs will be high. The first three outputs are applied to U9 and select the input to be sampled.

Flip-flop U12B is toggled when the $\overline{CC}$ output of converter U11 goes low. A high from the Q output will signal the computer that the data is ready. After the computer has read the data, it acknowledges with a high to gate U2D. This high is inverted and clears flip-flop U12B. It's then ready for the next low from the $\overline{CC}$ output.

Devices U14 and U15 are quad, 2 to 1, tri-state data multiplexers. When the select input, pin 1, is low, the data on pins 2, 5, 11, and 14 are applied to the output pins. When pin 1 goes high, pins 3, 6, 10, and 13 are selected for the output. If pin 15 is high, the outputs go into a high impedance state, and effectively disconnect themselves from the data buss. Multiplexers U14 and U15 also invert the data to put it into its true form.

Operation

Assume that normal ILS signals are present on all inputs to demultiplexer U9. PLL U16 is being synced and operating normal, and the monitor is disabled. The low on the enable line will hold flip-flop U12A clear. The high from the $\overline{Q}$ output will prevent down counter U13 from counting, and disconnect multiplexers U14 and U15 from the data buss. The low from the Q output will preset down counter U13 to binary 111. This will select pin 9 of demultiplexer U9 as the first input. The Q output will also prevent flip-flop U12B from toggling by applying a low to the J input. In this condition the monitor is in its inactive or waiting state.

The monitor 20 waits for action from the computer 30. In the following description numbers in parentheses refer to the flow chart of FIG. 8.

When the computer needs data from the monitor, it will drive the enable input high (110). This will put flip-flop U12A into the toggle mode. At the end of the sample cycle, a clock from F6 will toggle flip-flop U12A. The Q output will go low, enabling down counter U13 and connecting multiplexers U14 and U15 to the data buss. The $\overline{Q}$ output, being high, will stop the presetting of down counter U13, which is now ready to downcount. The high on the J input of flip-flop U12B will put it into the toggle mode.

When the counters pass through zero, the F1 output will send a pulse to PLL U16. At the same time, a pulse from F4 will reset counter U7. When the counters reach a count that corresponds to 22.0 degrees, a pulse from F8 will toggle the flip-flop of counter U7. Pin 13 of counter U7 will go high and turn on sample and hold circuit U10, which will charge capacitor C7 with the input signal. At a count that corresponds to 22.5 degrees, a pulse from F8 will toggle counter U7, which will cause device U10 to turn off. The charge on capacitor C7 is applied to converter U11.

A short time later, F3, which is normally high, will emit a pulse that will start U11's conversion. About 195 microseconds later the $\overline{CC}$ output will go low, signalling that the conversion is complete. This high to low transition will toggle flip-flop U12B, making its Q output go high. This high will tell the computer to read the data (140). With the select high input low the eight least significant bits of the data will be on the data buss. The computer will read the data (150), then drive the select input high (160). This will switch the four most significant bits and the identity bits to the data buss, which the computer also reads (170). The identity are applied to pins 3, 6, and 10 of multiplexer U15, and are the outputs of downcounter U13. Since downcounter U13 is set to binary 111, the identity bits will be inverted on the data buss to binary 000.

When the computer has stored the two bytes of information (220), the select input will go low again (290) and the acknowledge input will go high (300). This will clear flip-flop U12B, causing the read line to go low. The monitor will stay in this condition until the next pulse is emitted from F8. Sample pulses from F8 will be emitted at counts corresponding to 90, 270, and 337.5 degrees, and the process (120 to 300 or 330) will be repeated.

Near the end of the count, but before the pulse is emitted from F6, a pulse will be emitted from F7 that will decrement U13. This switches demultiplexer U9 to the input signal on line 12 at pin 10, and the sampling process (110 to 330) repeats for this input. The monitor will sample each input until the enable line goes low (350). This returns the monitor to its inactive or waiting state. When the computer 30 has the data for all four points for each input, it will perform the appropriate math (FIG. 8A) to get the required information. The data output on line 29, double precision format (200) is as follows:

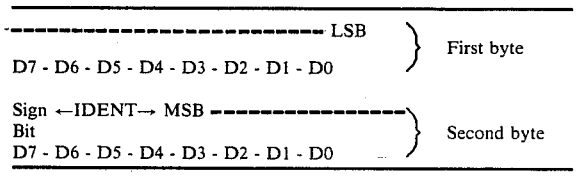

In the drawing, resistance values are shown in ohms, and capcitance values are in microfarads. Capacitor C7 is a polystyrene type. Capacitor C9 is a 4.7 microfarad tantilum, and capacitor C10 is 0.1 microfarad ceramic. The integrated circuit type numbers and biasing pins are identified in table B.

TABLE B

| I.C. | +V Pins | GND Pins | −V Pins | Device No. |
|---|---|---|---|---|
| U1 | 4 | | 11 | LM124 |
| U2 | 14 | 7 | | DM54LS00 |
| U3 | 5 | 13 | | DM54LS576 |
| U4 | 4 | 11 | | DM54LS93 |
| U5 | 4 | 11 | | DM54LS93 |
| U6 | 4 | 11 | | DM54LS93 |
| U7 | 4 | 11 | | DM54LS93 |
| U8 | 12 | 24 | | DM8575 |
| U9 | 13 | 14 | 3 | LF11508 |
| U10 | 1 | 7 | 4 | LF198 |
| U11 | 22,15 | 16,20,21 | | ADC1210 |
| U12 | 5 | 13 | | DM54LS76 |
| U13 | 16 | 8 | | DM54LS191 |
| U14 | 16 | 8 | | DM54LS258 |
| U15 | 16 | 8 | | DM54LS258 |
| U16 | 16 | 8 | | CD4046B |
| U17 | 14 | 7 | | DM54LS00 |
| U18 | 14 | 7 | | DM54LS08 |

Digital Computer Program

Figure 8A:
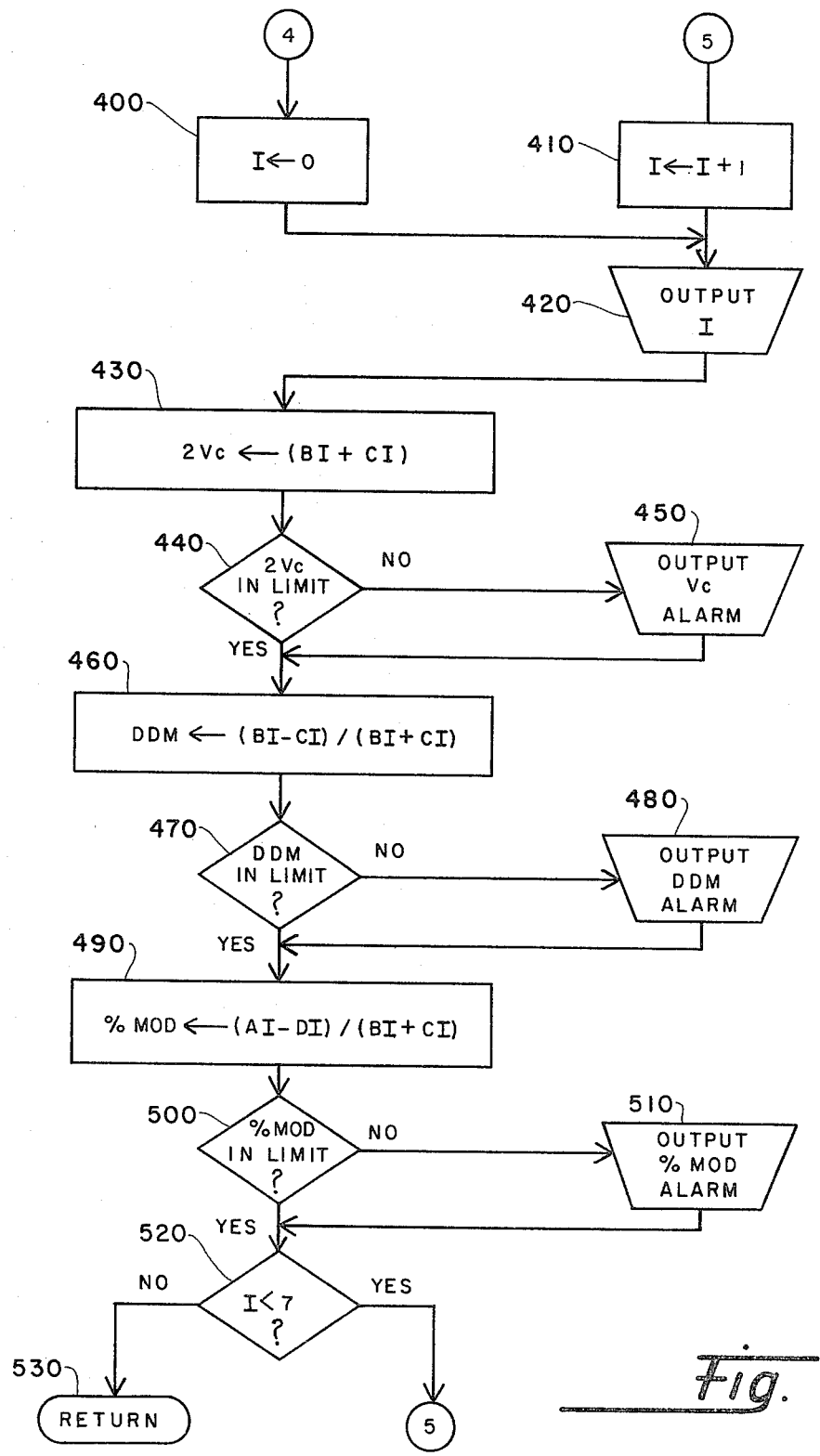

The flow charts of the program for the computer 30 appear in FIGS. 8 and 8A. Periodically the computer executes this program starting at box 100. The data may be stored in a memory matrix having four double precision locations A, B, C, D in one dimension, and eight in the other dimension for the input identity I which varies from zero to seven. Since the transfer of data from the monitor 20 to the computer 30 repeats for A, B, C and D, a loop is used in FIG. 8 with a counter X.

At box 110, an output signal "enable" is set high. The loop counter X is initialized to zero (120), and then advanced to one (130). The program then waits for the input signal "read" (140) to go high, and reads the first byte (150). The output signal "select" is set high (160), and the second byte is read (170). The two bytes of data are formated (200) with 12 bits and a sign bit designated as data Y, and three bits being the input identity I. Since the counter X is at "one" (210), the data Y is stored (220) in location A for input identity "zero".

The input identity I is supplied with the data at each of the four points A, B, C, D. To verify this, a variable I' is set equal to I at box 280, and in subsequent loops it is compared to I at box 230. If they are not equal, the program branches to an error routine.

After box 280, the pass through the loop is completed by resetting "select" (290) and sending an acknowledge pulse on lead "ACK" (300). The program then branches back to box 120 to advance the X counter and repeat the routine for data point B, the data being stored at box 250. On the third pass the data for point C is stored at box 270, and on the fourth pass the data for point D is stored at box 310. After resetting "select" (320) and sending a pulse on "ACK" (330), a decision box 340 is used to determine if data has been read and stored for all the inputs. If I is less than seven, the program branches back to box 120 to reset the X counter. The four data points for the next input are than read and stored. When I equals seven, the program branches from box 340 to 350 to reset the signal on the "enable" lead, and then goes to the calculation routine in FIG. 8A.

The flow chart of FIG. 8A shows the mathematics described near the beginning of this "Detailed Description" under the three headings "Creation of RF Level", "Creation of DDM" and "Creation of Percent Modulation". The calculations are done in turn for each of the inputs with identity I from zero to seven inclusive. The prescribed limits for each input are stored as constants, and compared with the calculated values. Any value which is not within the limit will cause an output signal to be generated.

ANALOG MONITOR

FIG. 7 is an example of an analog monitor. It performs all the math and will signal an alarm when the parameters exceed a preset limit. It requires one processor board for each input to be monitored. The control board is common to each monitor.

General Operation

Devices U21, U22, U23 and U24 are sample and hold IC's. Device U25 is a quad operational amplifier used as summing and differential circuits. Devices U26, U27 and U28 are precision analog multipliers. Devices U26 and U28 perform division to get DDM and percent modulation. Device U27 squares the RF level voltage, so its output will track the transmitter output power. Devices U29, U30 and U31 are dual comparators that compare the parameters to alarm levels. The sync 42 and PLL 44 circuits on the control board will be similar to the digital monitor. If the transmitter has digital tone generators, these two circuits might not be needed. The clock for the 10 bit counter 46 could come directly from the tone generator. The PROM (programable, read only memory) 48 keys the sample and hold IC's. The truth table for the PROM is in table C. The multimeter 50 provides the operator with meter readings of the parameters. The PROM is a type MM6351-1J mode by Monolitic Memories, Inc.

TABLE C

| Hex Address | 1 | 2 | 3 | 4 | |
|---|---|---|---|---|---|
| 03F | H | L | L | L | A |
| 0FF | L | H | L | L | B |
| 2FF | L | L | H | L | C |
| 3BF | L | L | L | H | D |

Detailed Operation

Device U25 is a unity gain amplifier which buffers the detector output. Its output is applied to the sample and hold IC's, U21 thru U24. Devices U21 and U22 sample points B and C respectively, and devices U23 and U24 sample points A and D respectively. Device U25B is the DDM amplifier and it subtracts points B and C. It's amplified by a factor of 20 and applied to divider U26. Device U25C adds samples B and C to get RF level. It is amplified by 2 and applied to devices U26, U27 and U28. The output of device U26 is DDM with a range of ±0.120 DDM. The offset circuit on the inverting input of device U25B allows operation of the board as a width monitor. With a normal width signal of 0.155 DDM in, the potentiometer is set for zero volts out of device U26. The output will have a range of ±0.120 DDM from the normal width value.

The output of device U27 is one tenth the square of the input. If the transmitter power should drop to 50% of normal, the voltage of U25C will drop to 70.7% of normal. However, because of the squaring performed by device U27, its output will drop to 50% of normal.

Device U25B subtracts samples A and D. Its gain can be adjusted from 1.8 to 2.2. This will compensate for the inherent 3.05% modulation error of this monitoring technique. The 4K-ohm potentiometer is adjusted for 40% (localizer) indication out of device U28 with a normal signal input.

The RF level goes to comparator U30A. The 4K-ohm potentiometer on the inverting lead is adjusted to produce a low output from device U30A when the transmitter power drops 50%.

The output of device U26 goes to comparators U29A and B. The 1K-ohm potentiometer controls the upper and lower DDM alarm limits, and the 15K-ohm potentiometer will center the alarm points about 0.000 DDM. If DDM should exceed the limits, the output of comparator U29A or B will go low. Device U31 is adjusted in a similar manner. The 2K-ohm potentiometer adjusts the modulation limits and the 10K-ohm will center then around 40% for a localizer and 80% for a glideslope.

The three light emitting diodes form an AND gate. If all three inputs are high, the output wil be high. If any comparator output goes low, its respective LED will conduct. The conducting diode will glow, giving the operator a visual indication of which parameter is at fault. The LEDs can be any diode that requires about 16 mA and can take 24 volts PIV. The output of the AND gate is fed to device U30B, which converts the comparators output (±12 V) to TTL logic levels. Any low to the diodes will cause the output of device U30B to go low. This will signal the transmitter control unit to initiate the appropriate action.

Alignment

To align the monitor, apply a normal ILS signal. Set the meter selector to RF level. Adjust the signal level for a 100.0 reading on the meter. This reading will be the percent normal output power. Set the selector to % Mod. Adjust the percent modulation gain potentiometer for 40.0% (80.0% for a glideslope). Set the selector to DDM. Adjust the DDM offset potentiometer for a zero reading. Adjust the alarm limit potentiometers for an alarm indication when each parameter reaches its alarm points.

The integrated circuit types and bias pins are identified in table D. The AD524 is a four quadrant multiplier, manufactured by Analog Devices.

TABLE D

| IC  | +V | GND | −V | Device No. |
|-----|----|-----|----|-----------|
| U21 | 1  | 7   | 4  | LF198     |
| U22 | 1  | 7   | 4  | LF198     |
| U23 | 1  | 7   | 4  | LF198     |
| U24 | 1  | 7   | 4  | LF198     |
| U25 | 4  |     | 11 | LM124     |
| U26 |    |     |    | AD534     |
| U27 |    |     |    | AD534     |
| U28 |    |     |    | AD534     |
| U29 | 11 |     | 6  | LM119     |
| U30 | 11 |     | 6  | LM119     |
| U31 | 11 |     | 6  | LM119     |

Thus, while preferred constructional features of the invention are embodied in the structure illustrated herein, it is to be understood that changes and variations may be made by the skilled in the art without departing from the spirit and scope of the invention.

I claim:

1. A system for monitoring a modulated RF signal for certain parameters of a radiated signal, wherein the modulation of the RF signal comprises a composite signal of plurality of tone frequencies which normally have a fixed phase relation such that the composite signal has repetitive cycles at a given lower frequency with respect to the tone frequencies, the RF signal being detected and demodulated to provide the composite signal; said system comprising:

monitor apparatus comprising sample and hold means, input means to apply said composite signal to the sample and hold means, timing means to provide timing signals at predetermined points of time in the composite cycle, said timing signals being applied to said sample and hold means to obtain sample signals representing the voltage of the composite signal at said pedetermined points during one cycle of the composite signal, said sample signals being supplied to computation means which perform arithmetic operations on combinations of the sample signals to determine said certain parameters.

2. A system as set forth in claim 1, wherein said composite signal comprises two superimposed tone frequencies which are both multiples of said lower frequency, one of said certain parameters being related to the relative amplitudes of the two tone frequencies.

3. A system as set forth in claim 2, wherein said tone frequencies are respectively three and five times said lower frequency so that the composite signal has the equation sin 3X+ sin 5X, wherein said predetermined points of time designated A, B, C, D occur respectively at substantially 22.5 degrees, 90 degrees, 270 degrees, and 337.5 degrees;

wherein said certain parameters include the difference of the depth of modulation DDM, the RF level Vc and the percent modulation;

wherein said computation means performs the operations $2Vc = B + C$ $DDM = (B-C)/(B+C)$ % modulation $= (A-D)/(B+C)$, and wherein said computation means further includes means for comparing the value of each of the calculated parameters to a predetermined value to determine whether it is within prescribed limits.

4. A system as set forth in claim 1, 2 or 3, wherein said monitor apparatus includes A/D converter means coupled to the output of said sample and hold means to convert the voltage amplitude into a digital format, and interface means coupled to transfer the digital format from the A/D converter means to said computation means, said computation means being a digital computer.

5. A system as set forth in claim 4, wherein there are a plurality of input leads for composite signals from separate related sources, wherein said monitor apparatus includes demultiplexing means with said input leads as inputs, and said timing means includes source counting means with its output coupled to the demultiplexing means so that one source at a time is selected and the corresponding input lead is coupled via the demultiplexing means to the sample and hold means, the output of the source counting means also being coupled via said interface means to the computing means to supply the identity of the source in digital format to the computing means.

6. A system as set forth in claim 5, wherein said timing means inlcudes an N-bit binary counter, a phase-locked loop having a frequency of $2^N$ times said given lower frequency, coupled to drive the binary counter, a programmed logic array having inputs from the N outputs of the binary counter, and having logic outputs programmed to produce signals at specific counts, one logic output being enabled at the count of zero and connected to the phase locked loop to regulate the output frequency by comparing it to a synchronization input, one logic output and divide-by-two circuit being used to control said sample and hold means so that it is enabled for short intervals ending with said predetermined points of time, one logic output being used to start said A/D converter means a short time after said predetermined point of time.

7. A system as set forth in claim 6, wherein said timing means further includes synchronization means coupled between one of said input leads and an input of said phase locked loop to synchronize the timing with the zero crossing at the start of each composite cycle.

8. A system as set forth in claim 6, wherein said A/D converter means produces a twelve-bit binary number encoded on twelve data output leads;

wherein said interface means comprises a two-to-one tri-state data multiplexer means and first and second JK flip-flops, interconnected with the A/D converter means, timing means and computation means to be operative each time the A/D converter means completes a conversion to transmit two bytes of information in succession to the computation means, the first byte comprising eight bits of said twelve-bit binary number, and the second byte comprising the remaining four bits of the binary number along with three bits from the source counter to identify the source and a sign bit.

* * * * *